US008961631B2

(12) United States Patent
Yao

(10) Patent No.: US 8,961,631 B2
(45) Date of Patent: Feb. 24, 2015

(54) PROCESS FOR PRODUCTION OF DISPERSION OF FLUORINATED NANO DIAMOND

(75) Inventor: Akifumi Yao, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 868 days.

(21) Appl. No.: 12/738,027

(22) PCT Filed: Oct. 10, 2008

(86) PCT No.: PCT/JP2008/068461
§ 371 (c)(1),
(2), (4) Date: Apr. 14, 2010

(87) PCT Pub. No.: WO2009/051076
PCT Pub. Date: Apr. 23, 2009

(65) Prior Publication Data
US 2011/0232199 A1    Sep. 29, 2011

(30) Foreign Application Priority Data

Oct. 15, 2007  (JP) ................. 2007-267655
Oct. 7, 2008   (JP) ................. 2008-260649

(51) Int. Cl.
*B24D 3/02*      (2006.01)
*C09C 1/68*      (2006.01)
*C09K 3/14*      (2006.01)
*C10M 169/04*    (2006.01)
*C01B 31/06*     (2006.01)

(52) U.S. Cl.
CPC .................. *C01B 31/065* (2013.01)
USPC ........................... 51/307; 508/154

(58) Field of Classification Search
USPC ............... 428/446; 508/154; 51/307
See application file for complete search history.

(56) References Cited

U.S. PATENT DOCUMENTS

| 7,300,958 B2 | 11/2007 | Kataoka et al. |
| 2005/0158549 A1 | 7/2005 | Khabashesku et al. |

FOREIGN PATENT DOCUMENTS

| CN | 1439451 | * | 9/2003 | |
| EP | 1 471 035 A2 | | 10/2004 | |
| EP | 1 471 035 A3 | | 10/2004 | |
| JP | 2004-339412 | * | 12/2004 | .............. C09K 3/14 |
| JP | 2005-001983 | | 1/2005 | |
| JP | 2005-097375 | | 4/2005 | |
| JP | 2007-238411 A | | 9/2007 | |
| JP | 2007-308351 | * | 11/2007 | .............. C01B 31/06 |
| JP | 2007-308351 A | | 11/2007 | |
| WO | WO 2007/142213 A1 | | 12/2007 | |

OTHER PUBLICATIONS

International Search Report including English translation dated Dec. 9, 2008 and PCT/ISA/237 (Eight (8) pages).
E. Osawa, Journal of the Japan Society for Abrasive Technology, 47, 414 (2003).
K. Hanada, Journal of the Japan Society for Abrasive Technology, 47, 422 (2003).
T. Ohi et al., Abstract of the 26$^{th}$ Fluorine Conference of Japan (Nov. 2002) p. 24-25.
A. Yonemoto et al., Abstract of the 83$^{rd}$ Spring Annual Meeting of the Chemical Society of Japan (Mar. 2003), p. 101.
H. Touhara et al., Third French-Japanese Seminar on Fluroine in Inorganic Chemistry and Electrochemistry (Apr. 2003).
Y. Liu et al., "Functionalization of Nanoscale Diamond Powder: Fluoro-, Alkyl-, Amino-, and Amino Acid-Nanodiamond Derivatives", Chem. Mater. 2004, 16, p. 3924-3930.
European Search Report dated Mar. 16, 2012 (Five (5) pages).

* cited by examiner

*Primary Examiner* — Shuangyi Abu Ali
(74) *Attorney, Agent, or Firm* — Crowell & Moring LLP

(57) ABSTRACT

There is provided a process for producing a fluorinated nanodiamond dispersion liquid, including a purification step of mixing a fluorinated nanodiamond with an alcohol having a carbon number of 4 or fewer, then conducting an ultrasonic treatment to produce a suspension, and subjecting the obtained suspension to a classification treatment by centrifugation to produce a dispersion liquid of fluorinated nanodiamond; a drying step to prepare a dry fluorinated nanodiamond by removing the alcohol from the dispersion liquid of fluorinated nanodiamond that is obtained by the purification step; and a redispersion step to prepare the fluorinated nanodiamond dispersion liquid by mixing the dry fluorinated nanodiamond that is obtained by the drying step, with an aprotic polar solvent and then conducting an ultrasonic treatment.

7 Claims, No Drawings

PROCESS FOR PRODUCTION OF DISPERSION OF FLUORINATED NANO DIAMOND

TECHNICAL FIELD

The present invention relates to a process for producing a fluorinated nanodiamond dispersion liquid, which is useful as a precision abrasive, a lubricant, a heat-exchange fluid medium, or the like.

BACKGROUND OF THE INVENTION

A diamond obtained by an impact pressure, explosive bombardment method (impact method) using an oxygen-deficient explosive, such as trinitrotoluene (TNT) or hexogen (RDX), is referred to as nanodiamond (ND), since the primary particles are extremely small to be 3-20 nm (e.g., Non-patent Publication 1 and Non-patent Publication 2). Due to its nanoscale particle size, ND is expected to be utilized in a wide use, besides normal diamond uses, such as abrasive, lubricant, heat-exchange fluid medium, composite materials with resin, metal, etc., electronic materials such as low dielectric film, emitter material, etc., and a medical field such as DNA support, virus-capturing support, etc. In the case of industrially using ND for the purpose of such use, it is requested to provide ND as a dispersion liquid in which fine particles of less than 100 nm are dispersed in liquid. However, since an impurity carbon layer, such as non-graphite and graphite films, is fused on the ND fine particle surface, and since ND is produced normally as secondary and tertiary aggregates having a particle size of 50-7500 nm as it is also referred to as cluster diamond (CD), it is necessary to conduct the removal of the impurity carbon layer of these and the pulverization of the aggregates. Furthermore, in the case of handling nano-level order particles by dispersing them in a solution, aggregation among particles tends to occur more easily if they are smaller particles, and the aggregated particles precipitate. Therefore, it is very difficult to obtain a stable dispersion liquid. Thus, as a means for solving these problems, a method for stably dispersing ND in liquid in primary particles with a bead-mill wet pulverizer, an ultrasonic homogenizer, etc. is variously studied (e.g., Patent Publication 1 and Patent Publication 2).

Furthermore, there is also reported a method of reacting CD with fluorine gas for the purpose of pulverizing secondary and tertiary ND aggregates (CD). For example, when CD is brought into contact with fluorine with a reaction temperature of 300-500° C., a fluorine gas pressure of 0.1 MPa, and a reaction time of 5-10 days, a fluorinated CD having a F/C molar ratio of about 0.2 (XPS, elementary analysis) is obtained, while maintaining the diamond structure (Non-patent Publication 3). It has been observed by TEM that this fluorine treatment makes a CD of a secondary particle diameter of about 40 μm have about 200 nm by a partial relaxation of the aggregation. Furthermore, it has been confirmed that CD friction coefficient extremely lowers by a rotary-type friction test using a mixed powder with polytetrafluoroethylene (PTFE) (Non-patent Publication 4). It has been reported that this was caused by that the non-graphite carbon on the ND surface had been removed by the reaction at a high temperature, and that the surface energy had lowered by the formation of CF group, $CF_2$ group, $CF_3$ group, etc. on the ND surface, as a ND lattice pattern by the TEM observation is evident (Non-patent Publication 5). Furthermore, there has also been reported that a synthesis of a fluorinated ND having a fluorine content of 5-8.6 at. % (analysis by EDX) by a fluorine treatment with reaction temperatures of 150, 310, 410 and 470° C., a F2/H2 flow rate ratio of 3/1, and a reaction time of 48 hours has brought a result of the improvement of dissolution in a polar solvent, such as ethanol, as compared with the original ND (Non-patent Publication 6 and Patent Publication 3). It is, however, difficult to completely pulverize the whole of the CD aggregates by this fluorination treatment. Therefore, in the case of obtaining a dispersion liquid in which a nano-order fluorinated ND having a particle size of less than 100 nm is dispersed, it is essential to conduct a classification operation, such as centrifugation treatment or filter filtration, after conducting a dispersion treatment with an ultrasonic homogenizer or the like. This classification operation lowers the concentration of a fluorinated ND to be dispersed. Therefore, it is necessary to conduct a step such as concentration to obtain a dispersion liquid in which a fluorinated ND is dispersed at a high concentration.

Patent Publication 1: JP-A-2005-1983
Patent Publication 2: JP-A-2005-97375
Patent Publication 3: US 2005/0158549 A1 specification
Non-patent Publication 1: Eiji OSAWA: Journal of the Japan Society for Abrasive Technology, 47, 414 (2003).
Non-patent Publication 2: Kotaro HANADA: Journal of the Japan Society for Abrasive Technology, 47, 422 (2003).
Non-patent Publication 3: Tatsumi OHI, Akiko YONEMOTO, Shinji KAWASAKI, Fujio OKINO, and Hidekazu TOUHARA: Abstract of the 26$^{th}$ Fluorine Conference of Japan (November, 2002) p. 24-25
Non-patent Publication 4: Akiko YONEMOTO, Tatumi OHI, Shinji KAWASAKI, Fujio OKINO, Fumiaki KATAOKA, Eiji OSAWA, and Hidekazu TOUHARA: Abstract of the 83rd Spring Annual Meeting of the Chemical Society of Japan (March, 2003), p. 101.
Non-patent Publication 5: H. Touhara, K. Komatsu, T. Ohi, A. Yonemoto, S. Kawasaki, F. Okino and H. Kataura: Third French-Japanese Seminar on Fluorine in Inorganic Chemistry and Electrochemistry (April, 2003).
Non-patent Publication 6: Y. Liu, Z. Gu, J. L. Margrave, and V. Khabashesku; Chem. Mater. 16, 3924 (2004).

SUMMARY OF THE INVENTION

Fluorinated ND is well dispersed in polar solvents including alcohols such as ethanol, isopropyl alcohol, etc. and shows a very high dispersibility particularly in aprotic polar solvents such as dimethyl sulfoxide, acetone, N,N-dimethylacetamide, etc. Fluorinated ND, however, contains a lot of aggregates having a particle size of 100 nm or greater (hereinafter expressed as aggregates), an impurity carbon, etc. Therefore, it is essential to conduct a classification treatment using a centrifuge, besides a dispersion treatment using an ultrasonic homogenizer or the like, in order to obtain a dispersion liquid in which only a nano-order fluorinated ND (hereinafter expressed as genuine fluorinated ND) having a particle size of 100 nm or less is dispersed in these solvents. However, in the case of selecting an aprotic polar solvent as the dispersion medium, aggregates of fluorinated ND also show a very high dispersibility in aprotic polar solvents. Therefore, it is very difficult by a classification treatment by a centrifuge to conduct a classification between the aggregates and the genuine fluorinated ND. It is not impossible to remove the aggregates by increasing revolution speed of the centrifuge. In that case, however, the genuine fluorinated ND is also removed together with the aggregates. Therefore, concentration of the dispersion liquid to be obtained is lowered, and thereby it is not possible to obtain a dispersion liquid in which fluorinated ND is dispersed at 1% or greater. It is necessary to additionally conduct an operation such as concentration in order to obtain a dispersion liquid in which fluorinated ND is dispersed at 1% or greater. In the case of concentrating the dispersion liquid, however, there is a possibility that dispersibility of fluorinated ND is lowered and that the average particle size increases. As a classification operation other than centrifugation, it is also possible to consider a classification method by filtration using filter paper or filter. It is possible to conduct a classification in a small amount of about several tens of milliliters. However, in the case of industrially treating a large volume of 1L or greater, the filter paper or filter is immediately clogged. Therefore, the classification is very difficult, and it is in a condition that a dispersion liquid of an aprotic polar solvent, in which the genuine fluorinated ND is dispersed at a concentration of 1% or greater, cannot be obtained.

It is an object of the present invention to provide a dispersion liquid in which the genuine fluorinated ND is dispersed at a concentration of 1% or greater and is stably dispersed for a long term of at least 120 hours or longer, while an aprotic polar solvent is used as a dispersion medium.

As a result of a repeated eager study to achieve the above object, the present inventors have found that a dry fluorinated ND obtained by firstly mixing fluorinated ND with an alcohol having a carbon number of 4 or fewer, then conducting an ultrasonic treatment to obtain a suspension, then subjecting the suspension to a classification treatment by centrifugation to produce a dispersion liquid, and then removing the alcohol portion in the dispersion liquid has a very high dispersibility. Then, we have found that it is possible by dispersing the dry fluorinated ND in an aprotic polar solvent to freely adjust the dispersion concentration of the genuine fluorinated ND within a range of 0.01-15% and to provide a dispersion liquid that is stable for a long term of at least 120 hours or longer, without increasing the average particle size, thereby reaching the present invention.

That is, the present invention provides a process for producing a fluorinated ND dispersion liquid, comprising a purification step of mixing fluorinated ND with an alcohol having a carbon number of 4 or fewer, then conducting an ultrasonic treatment to produce a suspension, and subjecting the obtained suspension to a classification treatment by centrifugation to produce a dispersion liquid of fluorinated ND; a drying step to prepare a dry fluorinated ND by removing the alcohol from the dispersion liquid of fluorinated ND that is obtained by the purification step; and a redispersion step to prepare the fluorinated ND dispersion liquid by mixing the dry fluorinated ND that is obtained by the drying step, with an aprotic polar solvent and then conducting an ultrasonic treatment.

DETAILED DESCRIPTION

The dispersion liquid production process of the present invention makes it possible to produce a dispersion liquid in which only the genuine fluorinated ND is dispersed in an aprotic polar solvent. Furthermore, the dry fluorinated ND, which is obtained by the drying step of the present invention, can be dispersed in solvents other than aprotic polar solvents, and it becomes possible to select the dispersion medium depending on the intended use of the dispersion liquid. Furthermore, it is possible to maintain a fluorinated ND dispersion liquid having an average particle size of 3-20 nm, which is obtained by the dispersion liquid production process of the present invention, with a stable dispersion for a long term of at least 120 hours or longer, without increasing the average particle size from 20 nm. Furthermore, the dispersion liquid production process of the present invention makes it possible to freely adjust the fluorinated ND content of the dispersion liquid within a range of 0.01-15%.

The fluorinated ND dispersion liquid obtained by the production process of the present invention can be utilized in a wide use, besides normal diamond uses, such as abrasive, lubricant, heat-exchange fluid medium, composite materials with resin, metal, etc., electronic materials such as low dielectric film, emitter material, etc., and a medical field such as DNA support, virus-capturing support, etc.

In the following, the present invention is furthermore described in detail.

The dispersion particles used in the present invention are of a fluorinated ND formed by modifying the ND surface with fluorine by a direct reaction between ND and fluorine gas, or a fluorination by fluorine plasma, etc. It is preferable that the fluorine content of this fluorinated ND is 10% or greater. In case that the fluorine content is less than 10%, there is a possibility that a dry fluorinated ND obtained by removing the alcohol in the drying step turns into aggregates again, thereby making it difficult to disperse in an aprotic polar solvent in the redispersion step. Furthermore, it is preferable that only the extreme surface of ND reacts in the fluorination, and thereby fluorine is attached to the surface single layer. If fluorine is attached to an inward exceeding the surface single layer, there is a possibility that the diamond structure is partially or entirely collapsed, and there is a possibility to cause the particle size variation and lowering of the particle strength. Although the maximum fluorine content in case that fluorine is attached to the surface single layer depends on the particle size of the primary particles, the maximum fluorine content is about 34% provided that, for example, all of the primary particles have a particle size of 3 nm and that the diamond crystalline structure is an octahedral single crystal, and it is 14.5% if the particle size is 10 nm.

The alcohol used in the purification step of the present invention is preferably one in which fluorinated ND is reasonably dispersed and which is easy to dry. Therefore, an alcohol having a carbon number of 4 or fewer is used. As an alcohol having a carbon number of 4 or fewer, it is also possible to specifically cite fluorine-containing alcohols such as tetrafluoropropanol, besides methanol, ethanol, isopropyl alcohol, butanol, etc. An alcohol having a carbon number greater than 4, such as hexanol or octanol, increases in viscosity as the carbon number increases, thereby lowering dispersibility of the fluorinated ND. Therefore, there is a possibility that a dispersion liquid of the genuine fluorinated ND cannot be obtained.

Furthermore, the aprotic polar solvent used in the redispersion step of the present invention can be selected in accordance with the application to be used. Although it is not particularly limited, it is possible to cite N, N-dimethylacetamide, N-methyl-2-pyrrolidone, N, N-dimethylformamide, dimethyl sulfoxide, acetonitrile, acetone, dimethoxyethane, hexamethylphosphoric acid triamide, etc. as typical examples of the aprotic polar solvent.

Next, a process for producing a fluorinated ND dispersion liquid of the present invention comprises a purification step of mixing fluorinated ND with an alcohol having a carbon number of 4 or fewer, then conducting an ultrasonic treatment to produce a suspension, and subjecting the obtained suspension to a classification treatment by centrifugation to produce a dispersion liquid of fluorinated ND from which impurities and aggregates have been removed; a drying step to prepare a dry fluorinated ND by removing the alcohol having a carbon number of 4 or fewer in the dispersion liquid of fluorinated ND that is obtained by the purification step, by an operation such as distillation; and a redispersion step to prepare the fluorinated ND dispersion liquid by mixing the dry fluorinated ND that is obtained by the drying step, with an aprotic polar solvent and then conducting an ultrasonic treatment.

In the purification step, with respect to the percentage to mix fluorinated ND and an alcohol having a carbon number of 4 or fewer, it is preferable to conduct the mixing so that fluorinated ND becomes 0.5-1.2% relative to the total mass of fluorinated ND and the alcohol having a carbon number of 4 or fewer. Even in the case of conducting the mixing at less than 0.5% of fluorinated ND, it is possible to achieve the object of the present invention. In the subsequent drying step, however, the fluorinated ND to be obtained is in a small amount. Therefore, in order to obtain a dispersion liquid in which fluorinated ND is dispersed at a high concentration in an aprotic polar solvent, it is necessary to produce fluorinated ND by enlarging the scale of the purification step or the drying step or by increasing the number of batches of each step. Thus, there is a possibility that productivity lowers. Furthermore, in the case of conducting the mixing at more than 1.2% of fluorinated ND, there is a possibility in the subsequent ultrasonic treatment that its effect is not sufficiently exhibited, and the target suspension cannot be obtained.

Furthermore, in the case of producing a suspension of fluorinated ND and an alcohol having a carbon number of 4 or fewer in the purification step, it is preferable that the ultrasonic irradiation output upon the ultrasonic treatment is 400 W or higher. If the irradiation output is lower than 400 W, there is a possibility that fluorinated ND is not sufficiently suspended and that the genuine fluorinated ND is also precipitated by the subsequent classification treatment by centrifugation. If the irradiation output is 400 W or higher, the object of the present invention can sufficiently be achieved. In view of the irradiation time, it is more preferable that the irradiation output is from 600 W to 1500 W. The irradiation time cannot be limited, since it also depends on the amount of the mixed liquid of fluorinated ND and an alcohol having a carbon number of 4 or fewer to be treated. For example, in case that the mixed liquid is in 100 ml, the treatment of 1 h or longer is necessary at an irradiation output of 400 W. The treatment is possible by 0.5 h at an irradiation output of 700 W and by 0.1 h at an irradiation output of 1500 W. Even if the treatment is conducted by an irradiation time longer than this, it does not interfere with the achievement of the object of the present invention. We, however, cannot expect to obtain the effect such as dispersion concentration increase.

Furthermore, it is preferable to conduct the classification treatment by subjecting the suspension after the ultrasonic irradiation to a centrifugation at a relative centrifugal acceleration of 3500 G to 6000 G in order to obtain a dispersion liquid containing the genuine fluorinated ND in the classification treatment by centrifugation in the purification step. If the relative centrifugal acceleration is lower than 3500 G, it is not possible to completely remove aggregates of fluorinated ND. Thus, it is not possible to obtain a dispersion liquid containing the genuine fluorinated ND. In the case of conducting the treatment at a relative centrifugal acceleration higher than 6000 G, there is a possibility that the genuine fluorinated ND is also precipitated and removed to lower the dispersion concentration of fluorinated ND. The treatment time of centrifugation can not be limited, since it depends on the relative centrifugal acceleration, the volume of the centrifugation tube to be used, etc. For example, in the case of using a centrifugation tube of 50 ml, 0.5 h is sufficient at a relative centrifugal acceleration of 4500 G, and 0.1 h at a relative centrifugal acceleration of 6000 G.

Next, in the drying step, it is preferable to conduct distillation (vacuum distillation, atmospheric distillation, etc.) as a method for removing the alcohol having a carbon number of 4 or fewer in the dispersion liquid containing the genuine fluorinated ND. It is also possible to conduct the drying treatment by a simple heating with a dryer or the like, but the alcohol used in the present invention is flammable and has a danger of fire or explosion. Therefore, in that case, it is necessary to have a measure such as using an inert gas such as $N_2$ as the atmospheric gas. It would be general to use vacuum distillation in order to shorten the treatment time and safely conduct the operation.

In the redispersion step, with respect to the mixing concentration of fluorinated ND and an aprotic polar solvent, it is preferable that fluorinated ND is in a range of 0.01-15% relative to the total mass of fluorinated ND and the aprotic polar solvent. It is possible to adjust the concentration according to the intended use. At a concentration higher than 15%, there is a possibility that stability of fluorinated ND lowers. In the worst case, there is a possibility that precipitation occurs within 120 hours.

Furthermore, it is necessary in the redispersion step to conduct an ultrasonic treatment on the mixture of fluorinated ND and the aprotic polar solvent in order to disperse fluorinated ND in the aprotic polar solvent to obtain a stable dispersion liquid. Similar to the purification step, it is preferable that the ultrasonic irradiation output is 400 W or higher. If the irradiation output is less than 400 W, there is a possibility that fluorinated ND is not sufficiently dispersed. If the irradiation output is 400 W or higher, it is possible to sufficiently achieve the object of the present invention. The irradiation time cannot be limited, since it depends on the amount of the mixed liquid of fluorinated ND and the aprotic polar solvent to be treated, the mixing concentration, etc. For example, in case that the total amount of the mixed liquid is 100 ml and the mixing concentration of fluorinated ND is 1%, the treatment of 0.2 h or longer is necessary at an irradiation output of 400 W, and that of 0.1 h or longer at an irradiation output of 700 W.

In the following, the present invention is specifically explained by examples.

EXAMPLES

Examples 1-5

In advance, ND (purified nanodiamond powder manufactured by the Limited Responsibility Company: Kanshuku Ryoun-Nomai Materials, Particle Size: 3-20 nm, Selling Agent: New Metals and Chemicals Corporation) was heated for 3 hours at 400° C. under a pressure of 1 kPa to remove water contained in ND. A nickel reaction tube was charged with 20 g of ND resulting from the drying treatment. At 20° C., fluorine gas was allowed to flow therethrough at a flow rate of 20 ml/min, and argon gas at a flow rate of 380 ml/min. Then, the sample was heated at 400° C., and the flow of the argon gas and the fluorine gas was continued for 140 hours to react ND with the fluorine gas to prepare a fluorinated ND. The fluorine content of the fluorinated ND produced was 12% by elemental analysis.

The obtained fluorinated ND was added by 2.4 g to 300 ml of ethanol (Examples 1-3) or isopropyl alcohol (Examples 4 and 5) as an alcohol having a carbon number of 4 or fewer, followed by conducting an ultrasonic irradiation at an output of 700 W for 0.5 hours by an ultrasonic homogenizer (VCX-750 made by Sonics & materials Co.), thereby producing a suspension in which fluorinated ND was dispersed.

Then, the obtained suspension was subjected to a classification treatment for 40 min by a centrifuge (CN-2060 made by HSIANGTAI Co.) at a rotation speed of 6000 rpm (relative centrifugal acceleration 3900 G), followed by taking a supernatant after the centrifugation to obtain a dispersion liquid. This dispersion liquid was subjected to the measurements of the average particle size and the dispersion particles concentration. With this, the contained maximum particle size was 56 nm, the average particle size was 12 nm, and the dispersion particles concentration was 0.4%.

300 ml of the obtained dispersion liquid was subjected to a vacuum distillation by a rotary evaporator (N-1000 T made by Tokyo Rikakikai Co., LTD.) to obtain 0.9 g of a dry matter of fluorinated ND. The above-mentioned operation from the mixing of fluorinated ND with an alcohol having a carbon number of 4 or fewer to the vacuum distillation was repeated to obtain 10 g in total of a dry matter of fluorinated ND.

The maximum particle size and the average particle size were measured by using a particle size distribution analyzer (FPAR 1000 made by OTSUKA ELECTRONICS CO., LTD.) by a dynamic light scattering method. There was taken the values calculated from the mass-converted particle size distribution obtained by converting frequency of each particle size by mass of the dispersion particles. As to the dispersion particles concentration, the dispersion liquid was weighed by 10 g, followed by drying at 50° C. by a dryer to remove the dispersion medium and then weighing mass of the remaining particles to calculate the dispersion particles concentration.

By using N-methyl-2-pyrrolidone (CAS No.: 872-50-4, Examples 1, 2 and 4) or N,N-dimethylacetamide (CAS: 127-19-5, Examples 3 and 5) as an aprotic polar solvent, a mixing was conducted so that mass of the dry matter of fluorinated ND relative to the total mass of the dry matter of fluorinated ND and the aprotic polar solvent was 1% in Examples 1, 3 and 4, 12% in Example 2, and 5% in Example 5, followed by conducting an ultrasonic irradiation at an output of 700 W for 0.1 hours by an ultrasonic homogenizer (VCX-750), thereby producing a dispersion liquid of fluorinated ND. Each dispersion liquid obtained in this manner was allowed to stand still for 120 hours and then subjected to the measurements of the dispersion particles concentration, the maximum particle size, and the average particle size. In each one, the dispersion particles concentration of the obtained dispersion liquid coincided with the concentration adjusted upon the mixing with the aprotic polar solvent.

Comparative Example 1

Except in that octanol (carbon number 8) was used in place of an alcohol having a carbon number of 4 or fewer, fluorinated ND was added by 2.4g to 300ml of octanol (carbon number 8), followed by a classification treatment by an ultrasonic homogenizer and a centrifuge, in the same manner as that of the above Examples 1-5. With this, however, all the fluorinated ND particles were precipitated after the centrifugation. Therefore, it was not possible to obtain a dispersion liquid of fluorinated ND.

Comparative Examples 2 & 3

A fluorinated ND resulting from a fluorination by the same manner as that of the above Examples 1-5 was subjected to a mixing so that mass of the fluorinated ND became 1% relative to the total mass of the fluorinated ND and an aprotic polar solvent (Comparative Example 2: N-methyl-2-pyrrolidone, Comparative Example 3: N,N-dimethylacetamide), followed by conducting an ultrasonic irradiation at an output of 700 W for 0.5 hours by an ultrasonic homogenizer (VCX-750), thereby producing a suspension in which fluorinated ND was dispersed. Then, the obtained suspension was subjected to a classification treatment for 40min by a centrifuge (CN-2060) at a rotation speed of 6000 rpm (relative centrifugal acceleration 3900G), followed by taking a supernatant after the centrifugation to obtain a dispersion liquid. This dispersion liquid was allowed to stand still for 120 hours and then subjected to the measurements of the maximum particle size, the average particle size and the dispersion particles concentration.

Comparative Example 4

20ml of the fluorinated ND dispersion liquid produced by the above Comparative Example 2 was concentrated by a dryer (DSR-111 made by Isuzu Seisakusho Co., Ltd.) by evaporating the solvent until the dispersion particles concentration became 2%. The concentrated liquid obtained was subjected to the measurements of the maximum particle size, the average particle size and the dispersion particles concentration.

The results of Examples 1-5 and Comparative Examples 1-4 are shown together in Table 1. With respect to the dispersion particles concentration, the maximum particle size and the average particle size in Table 1, Examples 1-5 show values of the dispersion liquid obtained by the redispersion step, Comparative Examples 2 and 3 show the values of the supernatant after the centrifugation, and Comparative Example 4 shows the values of the dispersion liquid obtained by the concentration.

TABLE 1

| Examples | Alcohol | Aprotic polar solvent | Dispersion particles conc. (%) | Maximum particle size (nm) | Average particle size (nm) |
|---|---|---|---|---|---|
| Example 1 | Ethanol | N-methyl-2-pyrrolidone | 1 | 62 | 12 |
| Example 2 | | N-methyl-2-pyrrolidone | 12 | 97 | 18 |
| Example 3 | | N,N-dimethylacetamide | 1 | 72 | 13 |
| Example 4 | Isopropyl alcohol | N-methyl-2-pyrrolidone | 1 | 61 | 12 |
| Example 5 | | N,N-dimethylacetamide | 5 | 98 | 16 |
| Comp. Ex. 2 | | N-methyl-2-pyrrolidone | 0.6 | 180 | 52 |
| Comp. Ex. 3 | | N,N-dimethylacetamide | 0.7 | 224 | 58 |
| Comp. Ex. 4 | | N-methyl-2-pyrrolidone | 2 | 420 | 167 |

The invention claimed is:

1. A process for producing a fluorinated nanodiamond dispersion liquid, comprising;
   a purification step of mixing a fluorinated nanodiamond with an alcohol having a carbon number of 4 or fewer, then conducting an ultrasonic treatment to produce a suspension, and subjecting the obtained suspension to a classification treatment by centrifugation to produce a dispersion liquid of fluorinated nanodiamond;
   a drying step to prepare a dry fluorinated nanodiamond by removing the alcohol from the dispersion liquid of fluorinated nanodiamond that is obtained by the purification step; and
   a redispersion step to prepare the fluorinated nanodiamond dispersion liquid by mixing the dry fluorinated nanodiamond that is obtained by the drying step, with an aprotic polar solvent and then conducting an ultrasonic treatment.

2. A process according to claim 1, wherein the fluorinated nanodiamond has a fluorine content of 10% or greater.

3. A process according to claim 1, wherein the fluorinated nanodiamond is in 0.5-1.2 mass % relative to total mass of the fluorinated nanodiamond and the alcohol having the carbon atom number of 4 or fewer, in the mixing of the fluorinated nanodiamond and the alcohol having the carbon atom number of 4 or fewer of the purification step.

4. A process according to claim 1, wherein irradiation output of an ultrasonic wave in the ultrasonic treatment of the purification step is 400 W or higher.

5. A process according to claim 1, wherein the centrifugation of the purification step is conducted at a relative centrifugal acceleration of 3500 G to 6000 G.

6. A process according to claim 1, wherein the dry fluorinated nanodiamond is in 0.01 to 15 mass % relative to total mass of the dry nanodiamond and the aprotic polar solvent, in the redispersion step.

7. A process according to claim 1, wherein irradiation output of a ultrasonic wave in the ultrasonic treatment of the redispersion step is 400 W or higher.

* * * * *